United States Patent

[11] 3,621,109

| [72] | Inventor | Roy Nakata<br>Bryn Mawr, Pa. |
|---|---|---|
| [21] | Appl. No. | 95,265 |
| [22] | Filed | Dec. 4, 1970 |
| [45] | Patented | Nov. 16, 1971 |
| [73] | Assignee | General Electric Company |

[54] ELECTRICAL INSULATOR AND METHOD OF MAKING
10 Claims, 5 Drawing Figs.

[52] U.S. Cl. .......................... 174/16,
29/631, 138/112, 174/28, 174/99
[51] Int. Cl. ........................... H01b 9/04
[50] Field of Search.......................... 174/28, 29,
16 B, 99 B, 15 C, 131, 100; 138/112, 113, 114;
29/631, 624, 626

[56] References Cited
UNITED STATES PATENTS
3,391,243  7/1968  Whitehead .......... 174/28

3,125,199  3/1964  Thompson .......... 174/28 X
2,449,073  9/1948  Johannesen .......... 174/28 X

*Primary Examiner*—Lewis H. Myers
*Assistant Examiner*—A. T. Grimley
*Attorneys*—J. Wesley Haubner, William Freedman, Frank L. Neuhauser, Oscar B. Waddell and Joseph B. Forman ABSTRACT: Discloses an electric insulator and a method of making same wherein an annular body of high dielectric constant insulating material is provided with conductive coatings on its inner and outer peripheries. In juxtaposition with the coatings are rings of insulating material that have their peripheries bonded to the coatings. The assembly comprising the annular body, the conductive coatings, and the insulating rings is ground along each of its lateral faces to produce precise flushness between each lateral face of the insulating body and the associated lateral edge of each conductive coating.

PATENTED NOV 16 1971 3,621,109

INVENTOR:
ROY NAKATA,
BY William Freedman
ATTORNEY

ELECTRICAL INSULATOR AND METHOD OF MAKING

BACKGROUND

The present application is related to my copending application Ser. No. 817,848, now U.S. Pat. No. 3,586,934 filed Apr. 21, 1969, and assigned to the assignee of the present application.

This invention relates to an electrical insulator for supporting a high-voltage conductor and, more particularly, relates to an insulator of this type comprising an annular body of high dielectric constant insulating material and metal fixtures respectively attached to the outer and inner peripheries of said body. The invention is also concerned with a method of making such an insulator.

By using for the insulator body a material having a high dielectric constant (typically several hundred relative to that of air,) one can cause substantially all the dielectric flux impressed upon the insulator to exist internal to the high dielectric constant material and to have a distribution essentially independent of the influence of any nearby low dielectric constant material. The distribution of the dielectric flux in such an insulator can be governed almost entirely by the geometry of the high dielectric constant insulating material, thus allowing this geometry to be controlled to provide the desired electric stress distribution.

One factor that can interfere with fully utilizing the high dielectric constant properties of the insulating material to achieve optimum electric stress distribution is the tendency of the dielectric flux to be nonuniform and to concentrate adjacent the metal fixtures at opposite ends of the insulator.

SUMMARY

An object of my invention is to apply the end fixtures to a body of high dielectric constant insulating material in such a manner that there is a substantially reduced tendency of the dielectric flux to concentrate and be nonuniform adjacent the end fixtures.

In carrying out the invention in one form, I provide an annular insulating support comprising an annular disk of high dielectric constant insulating material having an outer periphery, an inner periphery, and spaced apart lateral faces extending between said inner and outer peripheries. Each of the peripheries has a conductive coating bonded thereto having lateral edges located precisely flush with the lateral faces of said annular disk. Ring structures of electrical insulating material are bonded to said peripheral coatings, with each of said coatings sandwiched between a ring structure and said annular disk. The conductive coatings have substantially chip-free lateral edges, and the insulating disk has a substantially chip-free periphery adjacent said lateral edge, with the maximum misalignment between the lateral edge of each conductive coating and the immediately adjacent lateral face of said disk being less than 5 mils around the entire periphery of said disk. A thin coating of insulating material covers the lateral edge of each of said conductive coatings and the immediately adjacent lateral face of the annular disk adjacent said coating.

The method of making the insulator comprises the step of grinding the assembly comprising the insulating disk, the conductive coating and the ring structure along each of said lateral faces to remove sufficient material from each of said lateral faces, from the associated lateral edge of said coating, and from said ring structure to produce precise flushness between said lateral face and the associated lateral edge of the coating in the region of said coating about the entire periphery of said disk.

BRIEF DESCRIPTION OF DRAWINGS

For a better understanding of the invention, reference may be had to the following description taken in conjunction with the accompanying drawings, wherein.

DETAILED DESCRIPTION OF PREFERRED EMBODIMENT

Figure 1:
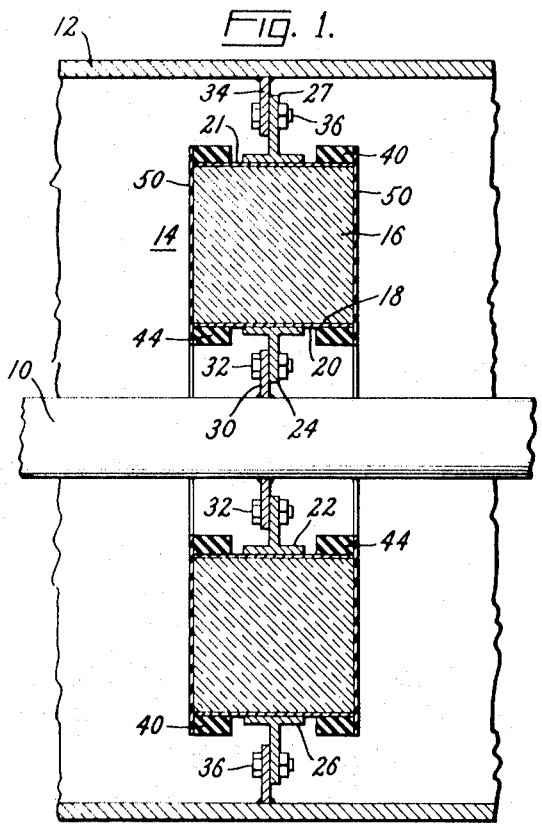
FIG. 1 is a cross-sectional view of an electric bus comprising an insulating support embodying one form of my invention.

Referring now to FIG. 1, there is shown a high-voltage conductor, or bus bar, 10 which it is desired to support within a tubular metal duct 12, which is at ground potential. For providing such support, an electrical insulator 14 is relied upon.

This insulator 14 comprises an annular disk 16 of a high dielectric constant insulating material such as, for example, barium titanate ceramic or a ceramic containing barium titanate. The disc has a central bore 18 which is metallized with a metallic coating 20. The outer periphery of disk 16 is metallized with a metallic coating 21. Brazed or otherwise suitably bonded to the inner metallized coating 20 is a metal ring 22 of generally T-shaped cross section which comprises a flange 24 projecting in a radially inward direction. Brazed or otherwise suitably bonded to the outer metallized coating 21 is another metal ring 26 of generally T-shaped cross section having a flange 27 projecting in a radially outward direction.

For securing the bus bar 10 to the insulator 14, I provide the bus bar with a radially outwardly projecting flange 30 that is effectively integral with the bus bar. The radially inwardly projecting flange 24 of the insulator radially overlaps flange 30 and is suitably attached thereto, preferably by a series of bolts 32 extending through aligned bolt holes in the two flanges 24 and 30.

For securing the insulator 14 to duct 12, the duct is provided with a radially inwardly projecting flange 34 that is effectively integral with the duct. Flange 34 radially overlaps flange 27 on the insulator and is suitably attached thereto, preferably by a series of bolts 36 extending through aligned boltholes in the two flanges 34 and 27.

It is important to note that the outer end fixtures 26, 34, 36 provide an electrical connection between the outer metallic coating 21 and the grounded duct 12; and the inner end fixtures 22, 30, 32 provide an electrical connection between the inner metallic coating 20 and the high-voltage bus bar 10. Thus, the outer coating 21 remains at ground potential, and the inner coating 20 remains at the same potential as the bus bar 10.

By using for the insulator body 16 a material, such as a suitable barium titanate ceramic, having a high dielectric constant (typically several hundred or more relative to that of air,) I can cause substantially all the dielectric flux impressed upon the insulator to exist internal to body 16 and to have a distribution essentially independent of the influence of any nearby low dielectric constant material, such as the surrounding air or gas. However, one factor that can interfere with fully utilizing the high dielectric constant properties of the insulating material to achieve optimum stress distribution is the tendency of the dielectric flux to concentrate adjacent the metal fixtures 20, 22 and 21, 26 at opposite ends of the insulator. Particular regions which are susceptible to undesirable stress concentrations are those located at the axially outer edges of the metal coatings 20 and 21.

Figure 2:
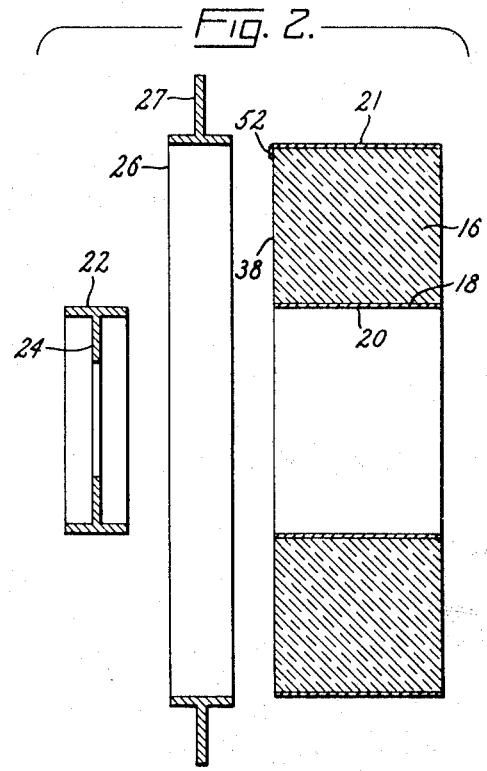
FIG. 2 shows one step used in the method of making the insulating support of FIG. 1.

My studies of this matter show that these stress concentrations result primarily from a failure of the metal coatings to terminate precisely flush with the adjacent lateral surface 38 of the insulating body 16. Applying the coating in a conventional manner will result in an irregular edge for the coating slightly spaced from the lateral face 38 of the insulator or will result in the coating spilling over slightly onto the lateral face 38, as indicated at 52 in FIG. 2. In addition, typically there are small chips in the periphery of the insulating body 16 at its edge or small chips in the edge of the metal coating that interfere with attainment of the desired precise alignment, or flushness, of the metal edge and the lateral face 38 in this crucial region.

Figure 3:
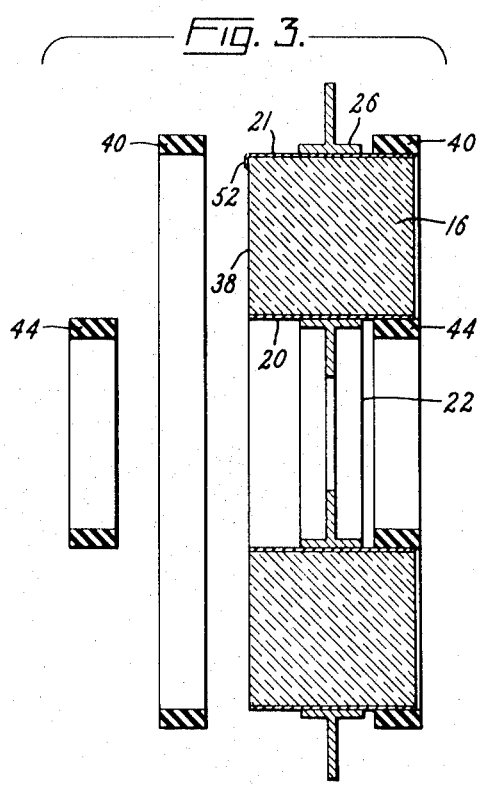
FIG. 3 shows a partially assembled insulating support after manufacturing steps in addition to those of FIG. 1 have occurred.

I effectively eliminate these misalignments at the edges of the metal coating by making the insulator in the following manner. First, the T-shaped rings 22 and 26 are assembled on the ceramic body 16 from their position shown in FIG. 1 and suitably brazed to the metallized coatings 20 and 21 thereon in the positions shown in FIG. 3. Then, two rings 40 of a suitable insulating material are slipped over the outer periphery of the insulator body 16 and are bonded by a suitable adhesive to the outer peripheral coating 21. (FIG. 3 shows the assembly with one of the insulating rings 40 in place on the outer peripheral coating 21.) The adhesive preferably completely fills any minor space that may be present between the bore of each of the insulating rings 40 and the metal coating 21 that it surrounds. The insulating rings 40 are disposed on axially opposed sides of the T-shaped metal ring 26 and have their outer lateral surfaces approximately aligned with the faces 38 of the insulator body 16. Additional insulating rings 44 are then applied to the inner periphery of the insulator body 16 in essentially the same manner, with an adhesive bond being present between the inner peripheral coating 20 and the outer periphery of the insulating rings 44. The resulting assembly is depicted in FIG. 4.

Figure 4:
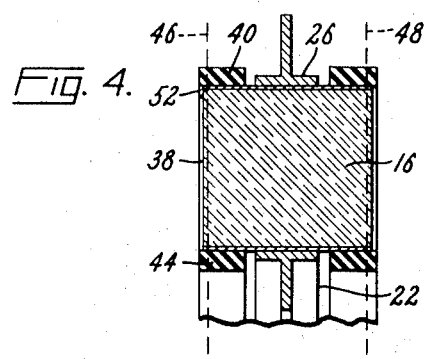
FIG. 4 shows the partially assembled insulating support after still further manufacturing steps.

Next, I surface grind the assembly on each of its lateral faces 38, removing sufficient material so as to develop two planar faces that extend along the dotted lines 46 and 48 of FIG. 4. This surface grinding produces, at each side of the insulator, precise alignment, or flushness, between the lateral face 38 of insulating body 16, the lateral faces of the insulating rings 40 and 44, and the edges of the metal coatings 20 and 21.

The purpose of the insulating ring 40 is to act as a backup for protecting the metal coating 21 against chipping during the above-described grinding operation. The metal coating 21, being sandwiched between the two substantially rigid bodies 16 and 40 in intimate engagement therewith around the entire finished edge region, is protected during grinding from any loads that could otherwise produce chips at the finished edge. The inner insulating ring 44 in a corresponding manner, protects the inner metal coating 20 against chipping during the grinding operation. The insulating rings 40 and 44 are preferably made of an epoxy material reinforced with glass fibers extending circumferentially of the rings.

During the grinding operation the sandwiching effect described in the immediately preceding paragraph acts not only to prevent chips from developing in the peripheral edge of the conductive coating but also acts to prevent tiny chips from developing in the ceramic material of body 16 immediately adjacent the lateral edge of the conductive coating. In the absence of this sandwiching effect, such chips in the ceramic are not infrequently produced by the grinding operation. The chipped away ceramic particle may be completely removed by the grinding operation or may, in some instances, remain in position due to an incomplete crack in the ceramic or due to the retaining effect of the adjacent metal coating, which might possibly still be intact. In either case, however, the presence of ceramic chips results in a high electric stress concentration which can be a source of dielectric breakdown along the lateral face of the insulator.

After the assembly of FIG. 4 has been ground as above described to provide a smooth lateral face at 38, the lateral face is coated with a thin layer of film of dielectric material. This dielectric coating which is depicted at 50 in FIGS. 1 and 5, typically has a thickness of about 2 mils. This thickness is greatly exaggerated in the drawing. A suitable material for the coating is an epoxy or polyester resin, a silicone varnish, or a polyester varnish. The purpose of the thin dielectric coating is to suppress field emission and microdischarge-initiated breakdowns from the edge of the conductive coatings 20 and 21. The dielectric coating must have a high resistivity, preferably in the neighborhood of $10^8$ ohm-centimeters but this resistivity should be a finite value in order to avoid trapped charge initiated breakdowns. The dielectric coating should preferably cover the entire lateral face of the assembly, but my invention in its broader aspects comprehends a dielectric coating that covers only the lateral edge of the metal coatings and the immediately adjacent face portion of the insulating body 16. Coverage of the faces of insulating end rings 40 and 44 is not important except insofar as it facilitates coverage of the lateral edge of the juxtaposed conductive coatings 20 and 21. The relative dielectric constant of the coating material is typically about 3 to 5.

It is to be noted that in applying the conductive coatings 20 and 21 to the peripheries of ceramic body 16 during its manufacture, no great care need be taken to terminate the conductive coatings precisely at the lateral faces of the block. If, by chance, coating 20 or 21 terminates in an irregular edge just short of the lateral face or happens to spill over onto the lateral face, as indicated at 52 in FIGS. 2–4, I can still use the ceramic body 16 without further processing it prior to its incorporation in the assembly of FIG. 4. This is made possible by the above-described grinding process to which I subject the assembly of FIG. 4. By grinding the assembly face sufficiently, I can locate the new lateral edge of the coating 21 laterally inward of any previously existing irregularities in the original outer edge of the conductive coating, thus removing these irregularities and providing a smooth lateral edge that is precisely flush with the finished lateral face 38 of the adjacent ceramic material of body 16.

Figure 5:
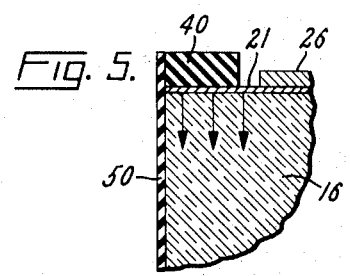
FIG. 5 is an enlarged view of a portion of the support of FIG. 1 with certain electric field relationships depicted therein.

The precise flushness that I attain between the edge of conductive coating 21 and the adjacent portion of face 38 of the insulating body 16 tends to force all lines of electric flux that emanate from conductive coating 21 and enter the ceramic material 16 in this crucial region to enter the ceramic material 16 perpendicular to the conductive coating, as viewed in FIG. 5. If precise flushness is not present, the flux lines tend to follow the curved paths illustrated in FIG. 5 of my aforesaid application Ser. No. 817,848 and to thereby produce the objectionable stress concentrations described in said application.

Similarly, the precise flushness between the edge of conductive coating 20 and the adjacent portion of body face 38 of insulating body 16 tends to force the electric flux that leaves the ceramic material 16 and enters coating 20 to leave the ceramic material perpendicular to the metal coating.

It is important that the end rings 40 and 44 be of insulating material rather than metal. Had these end rings been of metal, then significant lines of electric flux could emanate from regions of each metal ring spaced from the adjacent metal to ceramic interface and enter the ceramic via paths crowding undesirably around the edge of the associated coating in a manner similar to that depicted in FIG. 6 of my aforesaid application Ser. No. 817,848.

Another feature contributing to reduced stress concentrations at the edges of the metal coatings is that there are not metal structures immediately adjacent such coatings that project laterally beyond the edges of the coatings. In this regard, note that each of the T-shaped rings 22 and 26 is spaced axially inward of the outer edges of their associated coatings 20 and 21, respectively. While it is true that the duct 12 projects laterally beyond the lateral edges of the outer coating 21 and the bus 10 projects laterally beyond the edges of the inner coating 20, these parts 12 and 10 are spaced a substantial radial distance from their associated coatings 21 and 20, thus considerably reducing the effect of their presence.

Although I prefer to use a grinding machine for obtaining the above-described smooth lateral face of the assembly, it is to be understood that other suitable types of machine tools, preferably of the abrading type, can instead be used for this purpose. The machining operation should, however, at least be capable of limiting misalignments in the region of a conductive coating to less than 5 mils.

While I have shown and described a particular embodiment of my invention, it will be obvious to those skilled in the art that various changes and modifications may be made without departing from my invention in its broader aspects; and I, therefore, intend in the appended claims to cover all such changes and modifications as fall within the true spirit and scope of my invention.

What I claim as new and desire to secure by Letters Patent of the United States is:

1. A method of making an annular insulating support for a conductor comprising:
   a. providing an annular disk of high dielectric constant insulating material, the disk having an outer periphery, an inner periphery, and spaced apart lateral faces extending between said inner and outer peripheries,
   b. providing one of said peripheries with a conductive coating bonded thereto having lateral edges respectively located adjacent said lateral faces,
   c. providing in juxtaposition with said peripheral coating ring-shaped structure of electrical insulating material having a periphery bonded to said peripheral coating,
   d. grinding the assembly comprising said disk, said conductive coating, and said ring structure along each of said lateral faces to remove sufficient material from each of said lateral faces, from the associated lateral edge of said conductive coating, and from said ring structure to produce precise flushness between said lateral face and the associated lateral edge of the coating in the region of said coating about the entire periphery of said disk.

2. The method of claim 1 in which:
   a. the other periphery of said disk is provided with a conductive coating bonded thereto having lateral edges respectively located adjacent said lateral faces,
   b. additional ring structure of electrical insulating material is provided in juxtaposition to said latter conductive coating having a periphery bonded to said latter conductive coating, and
   c. the assembly comprising said disc, said latter conductive coating, and said additional ring structure is ground along each of said lateral faces to remove sufficient material from each of said lateral faces, from the associated lateral edge of said latter conductive coating, and from said additional ring structure to produce precise flushness between said lateral face and the associated lateral edge of the latter conductive coating in the region of said latter coating about the entire outer periphery of said disc.

3. The method of claim 1 in which an end fixture is joined to said conductive coating at a location spaced axially inward from the lateral edges of said conductive coating.

4. The method of claim 1 in which said one periphery of the disc is its outer periphery and said ring-shaped structure has its inner periphery surrounding said coating and bonded thereto.

5. The method of claim 1 in which said one periphery of the disc is its inner periphery and said ring-shaped structure has its outer periphery surrounded by said coating and bonded thereto.

6. The method of claim 2 in which end fixtures are respectively joined to said conductive coatings at locations that are spaced axially inward from the lateral edges of their associated conductive coatings.

7. An annular insulating support for a conductor comprising:
   a. an annular disc of high dielectric constant insulating material, the disc having an outer periphery, an inner periphery, and spaced apart lateral faces extending between said inner and outer peripheries,
   b. each of said peripheries having a conductive coating bonded thereto having lateral edges located precisely flush with the lateral faces of said annular disc,
   c. ring structures of electrical insulating material bonded to said peripheral coatings with said conductive coatings respectively sandwiched between a ring structure and said annular disc,
   d. said conductive coatings having substantially chip-free lateral edges and said annular disc having a substantially chip-free periphery adjacent said lateral edge, the maximum misalignment between the lateral edge of each of said conductive coatings and the immediately adjacent lateral face of said disc being less that 5 mils around the entire periphery of said disc, and
   e. a thin coating of insulating material covering the lateral edge of each of said conductive coatings and the immediately adjacent lateral face of the annular disc adjacent said conductive coating.

8. An annular insulating support as defined in claim 7 and further comprising an end fixture joined to one of said conductive coatings at a location spaced axially inward from the lateral edges of said one conductive coating, said end fixture projecting radially from said annular disc and adapted to be attached to adjacent structure.

9. An annular insulating support as defined in claim 7 and further comprising: a pair of end fixtures respectively joined to said conductive coatings at locations that are spaced axially inward from the lateral edges of their associated conductive coatings, one of said end fixtures projecting radially inwardly from said annular disc and the other projecting radially outwardly from said annular disc.

10. An enclosed electric bus comprising:
   a. a duct,
   b. a high-voltage conductor within said duct,
   c. the annular insulating support of claim 7 surrounding said conductor and supporting said conductor within said duct, and
   d. a pair of end fixtures respectively joined to the conductive coatings of said insulating support at locations that are spaced axially inward from the lateral edges of their associated conductive coatings,
   e. one of said end fixtures projecting radially inwardly from said annular discs,
   f. means for mounting said conductor on said one end fixture,
   g. the other of said end fixtures projecting radially outward from said annular disc, and
   h. means for mounting said other end fixture on said duct.

* * * * *